United States Patent
Fan

(10) Patent No.: US 9,838,331 B2
(45) Date of Patent: Dec. 5, 2017

(54) BASE STATION, USER EQUIPMENT AND METHOD FOR TCP TRANSMISSION WITH DYNAMIC TDD RECONFIGURATION

(71) Applicant: Telefonaktiebolaget L M Ericsson (publ), Stockholm (SE)

(72) Inventor: Rui Fan, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 187 days.

(21) Appl. No.: 14/646,367

(22) PCT Filed: Nov. 27, 2012

(86) PCT No.: PCT/CN2012/085332
§ 371 (c)(1),
(2) Date: May 20, 2015

(87) PCT Pub. No.: WO2014/082199
PCT Pub. Date: Jun. 5, 2014

(65) Prior Publication Data
US 2015/0288611 A1 Oct. 8, 2015

(51) Int. Cl.
*H04L 12/875* (2013.01)
*H04W 76/00* (2009.01)
(Continued)

(52) U.S. Cl.
CPC .............. *H04L 47/56* (2013.01); *H04L 5/14* (2013.01); *H04L 47/193* (2013.01);
(Continued)

(58) Field of Classification Search
CPC ... H04W 80/06; H04W 88/182; H04W 76/00; H04W 28/0273; H04W 84/042;
(Continued)

(56) References Cited

U.S. PATENT DOCUMENTS

| 7,821,294 B2 * | 10/2010 | Lichtensteiger ... H03K 19/0008 326/38 |
| 2003/0086407 A1 * | 5/2003 | Bhatt .................... H04L 1/0002 370/345 |

(Continued)

FOREIGN PATENT DOCUMENTS

| CN | 102137500 A | 7/2011 |
| WO | 2011/073737 A1 | 6/2011 |

OTHER PUBLICATIONS

International Preliminary Report on Patentability for Application No. PCT/CN2012/085332, dated Jun. 2, 2015, 6 pages.
(Continued)

*Primary Examiner* — Edan Orgad
*Assistant Examiner* — Ivan O Latorre
(74) *Attorney, Agent, or Firm* — Nicholson De Vos Webster & Elliott LLP

(57) ABSTRACT

The present disclosure provides a method for forwarding to a Transport Control Protocol (TCP) receiver a TCP transmission sent from a TCP sender. The method includes: determining Time Division Duplex (TDD) reconfiguration time required for a TDD reconfiguration; comparing the TDD reconfiguration time with a predetermined threshold; suspending the forwarding of the TCP transmission to the TCP receiver during the TDD reconfiguration time if the TDD reconfiguration time is larger than the predetermined threshold; and resuming the suspended forwarding of the TCP transmission after the TDD reconfiguration time has lapsed. The present disclosure also provides a method for transmitting a TCP transmission to a TCP receiver, a base station and a user equipment.

10 Claims, 6 Drawing Sheets

(51) Int. Cl.
  *H04L 5/14* (2006.01)
  *H04W 28/02* (2009.01)
  *H04L 12/825* (2013.01)
  *H04L 12/801* (2013.01)
  *H04L 12/841* (2013.01)
  *H04L 12/823* (2013.01)
  *H04L 1/18* (2006.01)
  *H04W 80/06* (2009.01)
  *H04W 88/18* (2009.01)
  *H04W 84/04* (2009.01)

(52) U.S. Cl.
  CPC ............ *H04L 47/266* (2013.01); *H04L 47/28* (2013.01); *H04L 47/283* (2013.01); *H04L 47/32* (2013.01); *H04W 28/0273* (2013.01); *H04W 76/00* (2013.01); *H04L 1/1835* (2013.01); *H04L 1/1848* (2013.01); *H04L 1/1874* (2013.01); *H04W 80/06* (2013.01); *H04W 84/042* (2013.01); *H04W 88/182* (2013.01)

(58) Field of Classification Search
  CPC . H04L 5/14; H04L 47/56; H04L 47/32; H04L 47/266; H04L 47/193; H04L 47/28; H04L 47/283; H04L 1/1848; H04L 1/1874; H04L 1/1835
  See application file for complete search history.

(56) References Cited

U.S. PATENT DOCUMENTS

| | | | | |
|---|---|---|---|---|
| 2004/0037224 A1* | 2/2004 | Choi | ............ | H04L 1/1812 370/235 |
| 2004/0114574 A1* | 6/2004 | Zeira | ............ | H04L 1/0002 370/352 |
| 2007/0099614 A1* | 5/2007 | Parekh | ............ | H04W 36/0083 455/436 |
| 2009/0106401 A1* | 4/2009 | Meng | ............ | H04L 29/12424 709/220 |
| 2010/0027446 A1* | 2/2010 | Choi | ............ | H04L 5/0053 370/280 |
| 2011/0164589 A1* | 7/2011 | Lee | ............ | H04W 36/02 370/331 |
| 2012/0063309 A1* | 3/2012 | Senga | ............ | H04L 69/163 370/232 |
| 2012/0069778 A1* | 3/2012 | Zhang | ............ | H04L 5/14 370/279 |
| 2012/0099417 A1* | 4/2012 | Sun | ............ | H04L 41/0681 370/216 |
| 2012/0320806 A1* | 12/2012 | Ji | ............ | H04B 7/2656 370/280 |
| 2012/0327821 A1* | 12/2012 | Lin | ............ | H04W 72/048 370/280 |
| 2013/0044652 A1* | 2/2013 | Wang | ............ | H04L 1/08 370/280 |
| 2013/0194980 A1* | 8/2013 | Yin | ............ | H04L 1/1854 370/280 |
| 2013/0223298 A1* | 8/2013 | Ahn | ............ | H04B 7/2643 370/280 |
| 2013/0235843 A1* | 9/2013 | Gohari | ............ | H04W 80/06 370/331 |
| 2013/0242819 A1* | 9/2013 | He | ............ | H04W 52/243 370/280 |
| 2013/0336177 A1* | 12/2013 | Gao | ............ | H04W 72/0446 370/280 |
| 2014/0050095 A1* | 2/2014 | Szilagyi | ............ | H04L 1/0002 370/236 |
| 2014/0119261 A1* | 5/2014 | Wang | ............ | H04W 72/04 370/312 |

OTHER PUBLICATIONS

International Search Report and Written Opinion for Application No. PCT/CN2012/085332, dated Sep. 5, 2013, 11 pages.
Susitaival et al., "Internet access performance in LTE TDD," Vehicular Technology Conference, IEEE, May 19, 2010, 5 pages.
"TDD DL-UL Reconfiguration Methods for eIMTA," 3GPP TSG RAN WG1 Meeting #69, R1-122318, May 21-25, 2012, pp. 1-5.
European Search Report and Written Opinion for Application No. EP 128888977.1, dated Jun. 29, 2016, 5 pages.
Huawei: "TDD Performance comparison of latency reduction schemes", 3GPP Draft; R2-102926 TDD Performance Comparison of Latency Reduction Schemes, 3rd Generation Partnership Project (3GPP), 3GPP TSG-RAN WG2 Meeting #70, May 10-14, 2010, pp. 1-15.
Alcatel-Lucent Shanghai Bell et al: "Discussion on timing issues with dynamic TDD UL-DL configuration", 3GPP Draft; R1-122510 Discussion on Timing Issues With Dynamic TDD UL-DL Configuration, #RD Generation Partnership Project (3GPP), 3GPP TSG RAN WG1 Meeting #69, May 21-25, 2012, pp. 1-8.

* cited by examiner

US 9,838,331 B2

BASE STATION, USER EQUIPMENT AND METHOD FOR TCP TRANSMISSION WITH DYNAMIC TDD RECONFIGURATION

CROSS-REFERENCE TO RELATED APPLICATIONS

This application is a National stage of International Application No. PCT/CN2012/085332, filed Nov. 27, 2012, which is hereby incorporated by reference.

TECHNICAL FIELD

The present invention relates to communication technology, and more particularly, to base station, user equipment and method for Transport Control Protocol (TCP) transmission with dynamic Time Division Duplex (TDD) reconfiguration.

BACKGROUND

Currently in the $3^{rd}$ Generation Partner Project (3GPP), a feature of dynamic Time Division Duplex (TDD) reconfiguration has been introduced in Long Term Evolution (LTE) system. That is, the TDD configuration in a cell is not fixed but may vary depending on actual traffic requirement. For example, if more traffic is required in the Downlink (DL), more subframes can be allocated to the DL. On the other hand, if more traffic is required in the Uplink (UL), more subframes can be allocated to the UL. Although the dynamic TDD reconfiguration is suitable to meet traffic requirements, it may be problematic for a Transport Control Protocol (TCP) transmission since it takes time to switch the TDD configuration at both a base station (e.g., evolved Node B (eNB)) and a User Equipment (UE), especially for their hardware components. If one of the base station and UE has finished the TDD reconfiguration while the other has not, there may be useless and thus unnecessary transmission of TCP packets, resulting in a waste of power which is vital especially for the UE.

Furthermore, if such TDD reconfiguration time is comparable with the TCP round trip time, the performance of the TCP transmission may be significantly degraded as the base station and UE cannot transmit or receive data successfully during the TDD reconfiguration time and a corresponding packet loss ratio will thus be very high. In particular, due to packet loss or delayed acknowledgement caused by the TDD reconfiguration, a timeout timer at the TCP sender may expire. In this case, with a congestion control mechanism according to the TCP protocol, a congestion window at the TCP sender will be reduced to 1 and the recovery of the TCP transmission will be very slow after the TDD reconfiguration due to e.g., the so called "slow start" mechanism.

SUMMARY

It is an object of the present invention to overcome at least one of the above defects in the prior art.

In order to achieve the object, according to an aspect of the present invention, a method for forwarding to a Transport Control Protocol (TCP) receiver a TCP transmission sent from a TCP sender is provided. The method includes: determining Time Division Duplex (TDD) reconfiguration time required for a TDD reconfiguration; comparing the TDD reconfiguration time with a predetermined threshold; suspending the forwarding of the TCP transmission to the TCP receiver during the TDD reconfiguration time if the TDD reconfiguration time is larger than the predetermined threshold; and resuming the suspended forwarding of the TCP transmission after the TDD reconfiguration time has lapsed.

According to another aspect of the present invention, a base station for forwarding to a Transport Control Protocol (TCP) receiver a TCP transmission sent from a TCP sender is provided. The base station includes: a determining unit adapted to determine Time Division Duplex (TDD) reconfiguration time required for a TDD reconfiguration; a comparing unit adapted to compare the TDD reconfiguration time with a predetermined threshold; a suspending unit adapted to suspend the forwarding of the TCP transmission to the TCP receiver during the TDD reconfiguration time if the comparison unit determines that the TDD reconfiguration time is larger than the predetermined threshold; and a resuming unit adapted to resume the suspended forwarding of the TCP transmission after the TDD reconfiguration time has lapsed.

According to another aspect of the present invention, a method for transmitting a Transport Control Protocol (TCP) transmission to a TCP receiver is provided. The method includes: obtaining Time Division Duplex (TDD) reconfiguration time required for a TDD reconfiguration; suspending transmission of TCP packets to the TCP receiver during the TDD reconfiguration time if the TDD reconfiguration time is larger than a predetermined threshold; and resuming the suspended transmission of TCP packets after the TDD reconfiguration time has lapsed.

According to another aspect of the present invention, a user equipment for transmitting a Transport Control Protocol (TCP) transmission to a TCP receiver is provided. The user equipment includes: an obtaining unit adapted to obtain Time Division Duplex (TDD) reconfiguration time required for a TDD reconfiguration; a suspension unit adapted to suspend transmission of TCP packets to the TCP receiver during the TDD reconfiguration time if the TDD reconfiguration time is larger than a predetermined threshold; and a resumption unit is adapted to resume the suspended transmission of TCP packets after the TDD reconfiguration time has lapsed.

With the embodiments of the present invention, when the TDD reconfiguration time is larger than a predetermined threshold, the TCP transmission can be suspended during the TDD reconfiguration time, such that unnecessary transmission of TCP packets during the TDD reconfiguration time can be avoided, allowing for reduced power consumption at the base station and/or the UE.

BRIEF DESCRIPTION OF THE DRAWINGS

The above and other objects, features and advantages will be more apparent from the following description of embodiments with reference to the figures, in which.

DETAILED DESCRIPTION OF EMBODIMENTS

The embodiments of the present invention will be detailed below with reference to the drawings. It should be noted that the following embodiments are illustrative only, rather than limiting the scope of the present invention.

Figure 1:
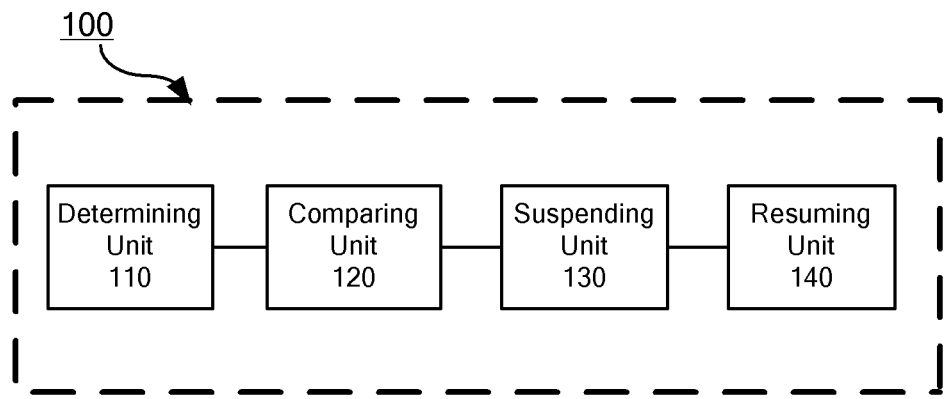
FIG. 1 is a block diagram of a base station according to an embodiment of the present invention.

FIG. 1 is a block diagram of a base station 100 according to an embodiment of the present invention. In this context, the base station 100 can be an eNB enabling TDD reconfiguration feature in a LTE system. According to the present invention, the base station 100 forwards to a TCP receiver a TCP transmission sent from a TCP sender. The TCP sender can be a server, a UE or any other suitable node which sends TCP packets to the TCP receiver. In an embodiment, the TCP receiver is a user equipment (UE) served by the base station 100. As shown in FIG. 1, the base station 100 includes a determining unit 110, a comparing unit 120, a suspending unit 130 and a resuming unit 140.

The determining unit 110 is configured to determine TDD reconfiguration time required for a TDD reconfiguration. As used herein, the "TDD reconfiguration time" refers to a time period required for both of the base station and the UE to complete the TDD reconfiguration and can be estimated based on the capabilities of the base station and the UE. For example, the determining unit 110 can determine the time required for the base station 100 to perform the TDD reconfiguration, t1, and obtain the time required for the UE to perform the TDD reconfiguration, t2, from the UE. Then, the determining unit 110 can determine the TDD reconfiguration time as max(t1, t2).

The comparing unit 120 is configured to compare the TDD reconfiguration time determined by the determining unit 110 with a predetermined threshold. As a non-limiting example, for a TCP transmission over the Internet, which has a time out value in the order of hundreds of milliseconds, the predetermined threshold can be set as 100 ms.

The suspending unit 130 is configured to suspend the forwarding of the TCP transmission to the TCP receiver during the TDD reconfiguration time if the comparison by the comparing unit 120 indicates that the TDD reconfiguration time is larger than the predetermined threshold.

The resuming unit 140 is configured to resume the forwarding of the TCP transmission, as suspended by the suspending unit 130, after the TDD reconfiguration time has lapsed.

According to an embodiment, the base station 100 further includes a delaying unit (not shown). The delaying unit is configured to: prior to the TDD reconfiguration, delay the forwarding of the TCP transmission for a time period dependent on the TDD reconfiguration time, such that an expiration value of the TCP timeout timer at the TCP sender is increased to a value that does not cause the timer to expire due to the suspension. As a non-limiting example, if the TDD reconfiguration time, and thus the duration of the suspension, is 200 ms, then the base station may delay a first TCP packet in the TCP transmission for 20 ms, a second TCP packet for another 20 ms, a third TCP packet for yet another 20 ms, and so on. The delay introduced at the base station itself will not cause the TCP timeout timer to expire as the latter is in the order of hundreds of milliseconds. After delaying ten TCP packets in this way, the expiration value of the TCP timeout timer at the TCP sender can be increased by at least 200 ms such that the timer will not expire due to the subsequent suspension.

According to an embodiment, the base station 100 further includes an acknowledge transmitting unit (not shown). The acknowledge transmitting unit is configured to: prior to the TDD reconfiguration, transmit to the TCP sender a first TCP Acknowledge (ACK) packet to disable the TCP sender from sending any further TCP packet. Here, the first TCP ACK packet can have a receive window field of zero value. The acknowledge transmitting unit is further configured to: after the TDD reconfiguration time has lapsed, transmit to the TCP sender a second TCP ACK packet to enable the TCP sender to send any further TCP packet. Here, the second TCP ACK packet can have a receive window field of a non-zero value.

According to another embodiment, the TCP transmission includes a first TCP transmission from the TCP sender to a proxy and a second TCP transmission from the proxy to the TCP receiver. The base station 100 can further include an instructing unit (not shown). The instructing unit is configured to: prior to the TDD reconfiguration, instruct the proxy to transmit to the TCP sender a first TCP Acknowledge (ACK) packet to disable the TCP sender from sending any further TCP packet. The instructing unit is further configured to: after the TDD reconfiguration time has lapsed, instruct the proxy to transmit to the TCP sender a second TCP ACK packet to enable the TCP sender to send any further TCP packet. Again, the first TCP ACK packet can have a receive window field of zero value and the second TCP ACK packet can have a receive window field of a non-zero value. Here, the proxy can be located between the TCP sender and the base station.

Figure 2:
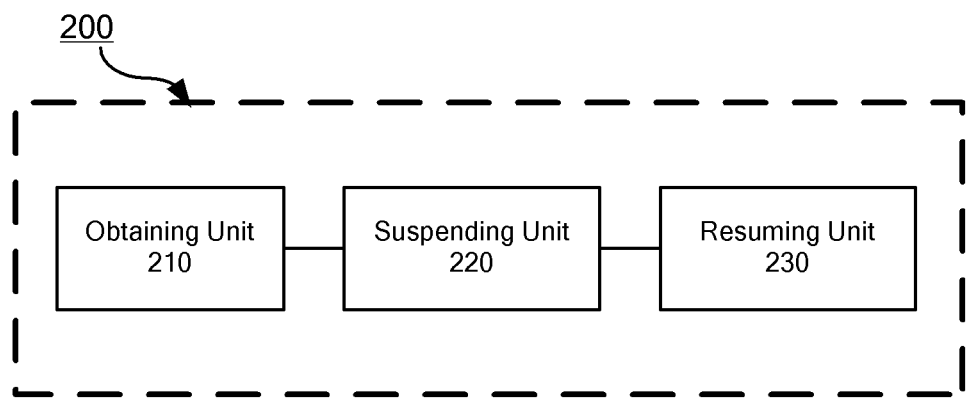
FIG. 2 is a block diagram of a user equipment (UE) according to an embodiment of the present invention.

FIG. 2 is a block diagram of a user equipment (UE) 200 according to an embodiment of the present invention. According to the present invention, the UE 200 transmits a Transport Control Protocol (TCP) transmission to a TCP receiver via a base station. As shown in FIG. 2, the UE 200 includes an obtaining unit 210, a suspending unit 220 and a resuming unit 230.

The obtaining unit 210 is configured to obtain TDD reconfiguration time required for a TDD reconfiguration. For example, the obtaining unit 210 can obtain the time required for the base station to perform the TDD reconfiguration, t1, from the base station and determines the time required for the UE 200 to perform the TDD reconfiguration, t2. Then, the obtaining unit 210 can determine the TDD reconfiguration time as max(t1, t2). Alternatively, the UE 200 may notify the base station of the time t2 to allow the determining unit 110 of the base station to determine the TDD reconfiguration time and then obtain the TDD reconfiguration time from the base station.

The suspending unit 220 is configured to suspend transmission of TCP packets to the TCP receiver during the TDD reconfiguration time obtained by the obtaining unit 210 if the TDD reconfiguration time is larger than a predetermined threshold.

The resuming unit 230 is configured to resume the transmission of TCP packets, as suspended by the suspending unit 220, after the TDD reconfiguration time has lapsed.

In an embodiment, the UE 200 further includes a comparing unit (not shown). The comparing unit is configured to compare the TDD reconfiguration time with the predetermined threshold to determine if the TDD reconfiguration time is larger than the predetermined threshold.

In an embodiment, the UE 200 further includes a delaying unit (not shown). The delaying unit is configured to: prior to the TDD reconfiguration, delay, at a lower layer than the TCP layer, transmission of TCP packets for a time period dependent on the TDD reconfiguration time, such that an expiration value of the TCP timeout timer at the UE (i.e., TCP sender) is increased to a value that does not cause the timer to expire due to the suspension. As a non-limiting example, upon receiving a TCP packet, the Packet Data Convergence Protocol (PDCP) layer does not send the packet to the Radio Link Control (RLC) layer immediately, but instead buffers the packet for a time period and then delivers it to the RLC layer. In a non-limiting example, if the TDD reconfiguration time, and thus the duration of the suspension, is 200 ms, then the lower layer may delay a first TCP packet in the TCP transmission for 20 ms, a second TCP packet for another 20 ms, a third TCP packet for yet another 20 ms, and so on. The delay introduced at the lower layer itself will not cause the TCP timeout timer to expire as the latter is in the order of hundreds of milliseconds. After delaying ten TCP packets in this way, the expiration value of the TCP timeout timer at the TCP layer can be increased by at least 200 ms such that the timer will not expire due to the subsequent suspension.

In the following, the functions and operations of the respective components of the base station 100 and the UE 200 will be further detailed with reference to the examples shown in FIGS. 3-8. It should be noted that the present invention is not limited to the following examples.

First Example

Figure 3:
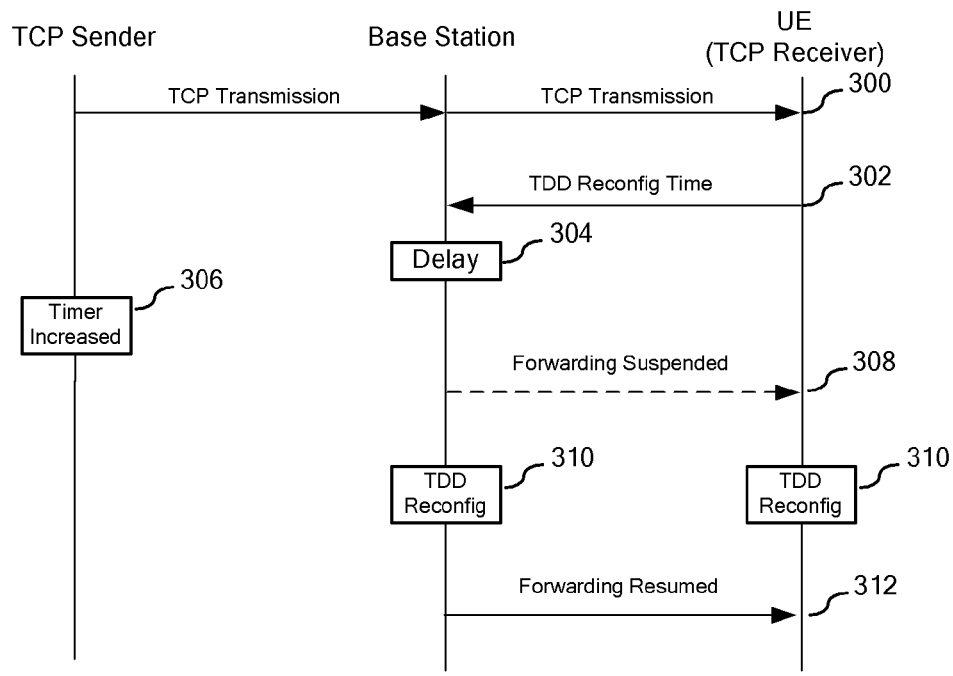
FIG. 3 is a sequence chart of a first example according to the present invention.

FIG. 3 is a sequence chart of a first example according to the present invention. In this example, a base station forwards to a TCP receiver (in this case, a UE served by the base station) a TCP transmission sent from a TCP sender. As shown in FIG. 3, at step 300, the TCP transmission is in progress. The base station decides to perform a TDD reconfiguration.

At step 302, the base station obtains from the UE the time required for the UE to perform a TDD reconfiguration, t2. The determining unit 110 of the base station can determine the time required for the base station to perform the TDD reconfiguration, t1, and determine the TDD reconfiguration time as max(t1, t2). Then the comparing unit 120 of the base station compares the TDD reconfiguration time determined by the determining unit 110 with a predetermined threshold. Alternatively, the determination and the comparison can be carried out at the UE's initial access to the base station.

If the comparison by the comparing unit 120 indicates that the TDD reconfiguration time is larger than the predetermined threshold, then, at step 304, the delaying unit of the base station delays the forwarding of the TCP transmission for a time period dependent on the TDD reconfiguration time. The base station can detect TCP packets by means of Deep Packet Inspection (DPI), for example.

Here, each TCP packet is delayed such that a TCP ACK packet corresponding to the delayed TCP packet can be received by the TCP sender before the TCP timeout timer at the TCP sender expires. That is, due to the delay, the TCP round trip time is increased, but not so much to cause the TCP timeout timer to expire.

In turn, due to the increased TCP round trip time, an expiration value of the TCP timeout timer at the TCP sender is increased (step 306). Here, the delay time period is configured such that the expiration value of the TCP timeout timer at the TCP sender is increased to a value that does not cause the timer to expire due to a subsequent suspension of TCP transmission during the TDD reconfiguration time, which will be detailed later.

Then, at step 308, the suspending unit 130 of the base station suspends the forwarding of the TCP transmission to the TCP receiver. At step 310, the TDD reconfiguration is performed at both the base station and the UE. During the suspension, i.e., during the TDD reconfiguration time, the TCP packets received from the TCP sender will be buffered at the base station without forwarding to the UE. After the TDD reconfiguration is completed, i.e., after the TDD reconfiguration time has lapsed, the resuming unit 140 of the base station resumes the forwarding of the TCP transmission at step 312 and the buffered TCP packets can now be forwarded to the UE.

On the other hand, if at step 302 the comparison by the comparing unit 120 indicates that the TDD reconfiguration time is smaller than the predetermined threshold, the step 304, 306, 308 and 312 can be omitted and no special action is carried out for the TDD reconfiguration.

Second Example

Figure 4:
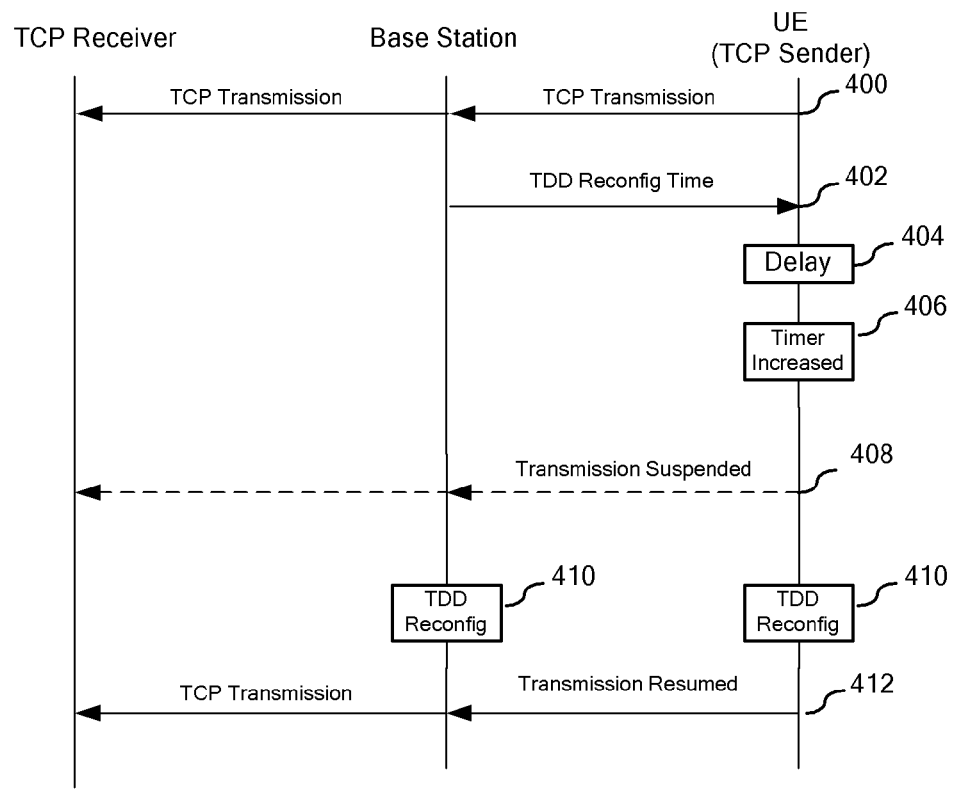
FIG. 4 is a sequence chart of a second example according to the present invention.

FIG. 4 is a sequence chart of a second example according to the present invention. In this example, the UE, as a TCP sender, transmits a TCP transmission to a TCP receiver via a base station. As shown in FIG. 4, at step 400, the TCP transmission is in progress. The base station decides to perform a TDD reconfiguration.

At step 402, the obtaining unit 210 of the UE obtains the time required for the base station to perform the TDD reconfiguration, t1, from the base station and determines the time required for the UE to perform the TDD reconfiguration, t2. Then, the obtaining unit 210 can determine the TDD reconfiguration time as max(t1, t2). Alternatively, the UE may notify the base station of the time t2 to allow the determining unit 110 of the base station to determine the TDD reconfiguration time and then obtain the TDD reconfiguration time from the base station. As noted above, the step 402 can be carried out at the UE's initial access to the base station.

The comparing unit of the UE can compare the TDD reconfiguration time with the predetermined threshold to determine if the TDD reconfiguration time is larger than the predetermined threshold. Here, the comparing unit is optional and in an alternative embodiment, the UE may receive the comparison result from the base station.

If the comparison result indicates that the TDD reconfiguration time is larger than the predetermined threshold, then, at step 404, the delaying unit of the UE delays, at a lower layer than the TCP layer, transmission of TCP packets for a time period dependent on the TDD reconfiguration time.

As described above, each TCP packet is delayed such that a TCP ACK packet corresponding to the delayed TCP packet can be received by the TCP sender (the UE itself in this case) before the TCP timeout timer at the TCP sender expires. That is, due to the delay, the TCP round trip time is increased, but not so much to cause the TCP timeout timer to expire.

Due to the increased TCP round trip time, an expiration value of the TCP timeout timer at the TCP sender is increased (step 406). Here, the delay time period is configured such that the expiration value of the TCP timeout timer at the TCP sender is increased to a value that does not cause the timer to expire due to a subsequent suspension of TCP transmission during the TDD reconfiguration time, which will be detailed later.

Then, at step 408, the suspending unit 220 of the UE suspends transmission of TCP packets to the TCP receiver. At step 410, the TDD reconfiguration is performed at both the base station and the UE. During the suspension, i.e., during the TDD reconfiguration time, the TCP packets to be transmitted will be buffered at the lower layer of the UE. After the TDD reconfiguration is completed, i.e., after the TDD reconfiguration time has lapsed, the resuming unit 230 of the UE resumes the suspended transmission of TCP packets at step 412 and the buffered TCP packets can now be transmitted from the UE.

On the other hand, if at step 402 the comparison result indicates that the TDD reconfiguration time is smaller than the predetermined threshold, the step 404, 406, 408 and 412 can be omitted and no special action is carried out for the TDD reconfiguration.

Third Example

Figure 5:
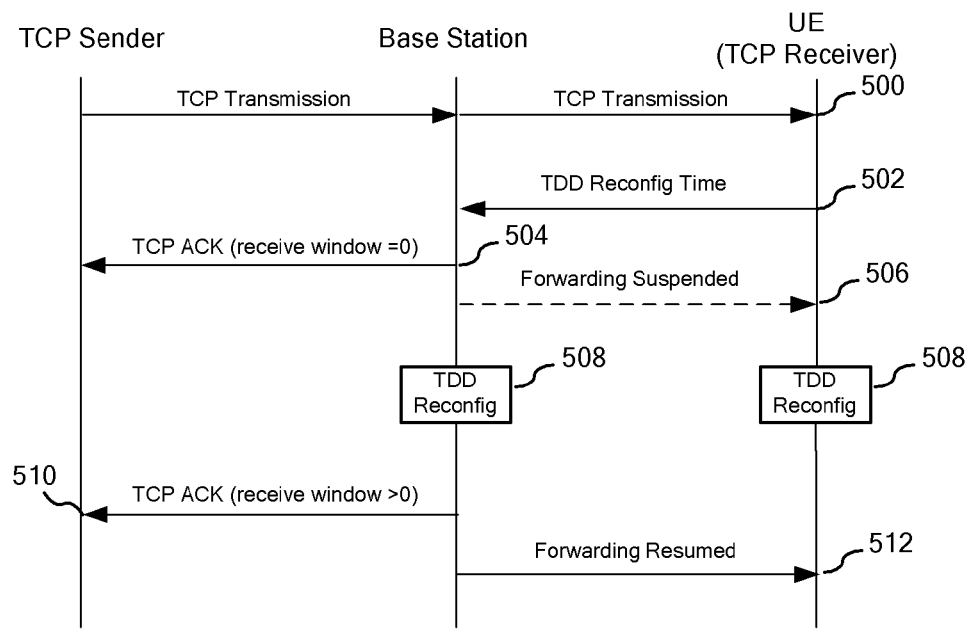
FIG. 5 is a sequence chart of a third example according to the present invention.

FIG. 5 is a sequence chart of a third example according to the present invention. In this example, a base station forwards to a TCP receiver (in this case, a UE served by the base station) a TCP transmission sent from a TCP sender. As shown in FIG. 5, at step 500, the TCP transmission is in progress. The base station decides to perform a TDD reconfiguration.

At step 502, the determining unit 110 of the base station determines TDD reconfiguration time required for a TDD reconfiguration, as described above. Then the comparing unit 120 of the base station compares the TDD reconfiguration time determined by the determining unit 110 with a predetermined threshold. Alternatively, the determination and the comparison can be carried out at the UE's initial access to the base station.

If the comparison by the comparing unit 120 indicates that the TDD reconfiguration time is larger than the predetermined threshold, then, at step 504, the acknowledge transmitting unit of the base station transmits to the TCP sender a first TCP ACK packet to disable the TCP sender from sending any further TCP packet. Here, the first TCP ACK packet can have a receive window field of zero value. As an example, the acknowledge transmitting unit can intercept a TCP ACK packet to be forwarded to the TCP sender, overwrite the receive window field of the intercepted TCP ACK packet into 0 and transmit the TCP ACK packet to the TCP sender.

Then, at step 506, the suspending unit 130 of the base station suspends the forwarding of the TCP transmission to the TCP receiver. At step 508, the TDD reconfiguration is performed at both the base station and the UE. During the suspension, i.e., during the TDD reconfiguration time, the TCP packets received from the TCP sender (i.e., TCP packets transmitted from the TCP sender before it receives the first TCP ACK packet and arriving at the base station during the TDD reconfiguration time) will be buffered at the base station without forwarding to the UE. After the TDD reconfiguration is completed, i.e., after the TDD reconfiguration time has lapsed, at step 510, the acknowledge transmitting unit of the base station transmits to the TCP sender a second TCP ACK packet to enable the TCP sender to send any further TCP packet. Here, the second TCP ACK packet can have a receive window field of a non-zero value. In the above example where the acknowledge transmitting unit intercepts a TCP ACK packet and overwrites the receive window field of the intercepted TCP ACK packet into 0, at step 510, the acknowledge transmitting unit can transmit to the TCP sender the intercepted TCP ACK packet as it is.

At step 512, the resuming unit 140 of the base station resumes the forwarding of the TCP transmission and the buffered TCP packets, if any, can now be forwarded to the UE.

On the other hand, if at step 502 the comparison by the comparing unit 120 indicates that the TDD reconfiguration time is smaller than the predetermined threshold, the step 504, 506, 510 and 512 can be omitted and no special action is carried out for the TDD reconfiguration.

Fourth Example

Figure 6:
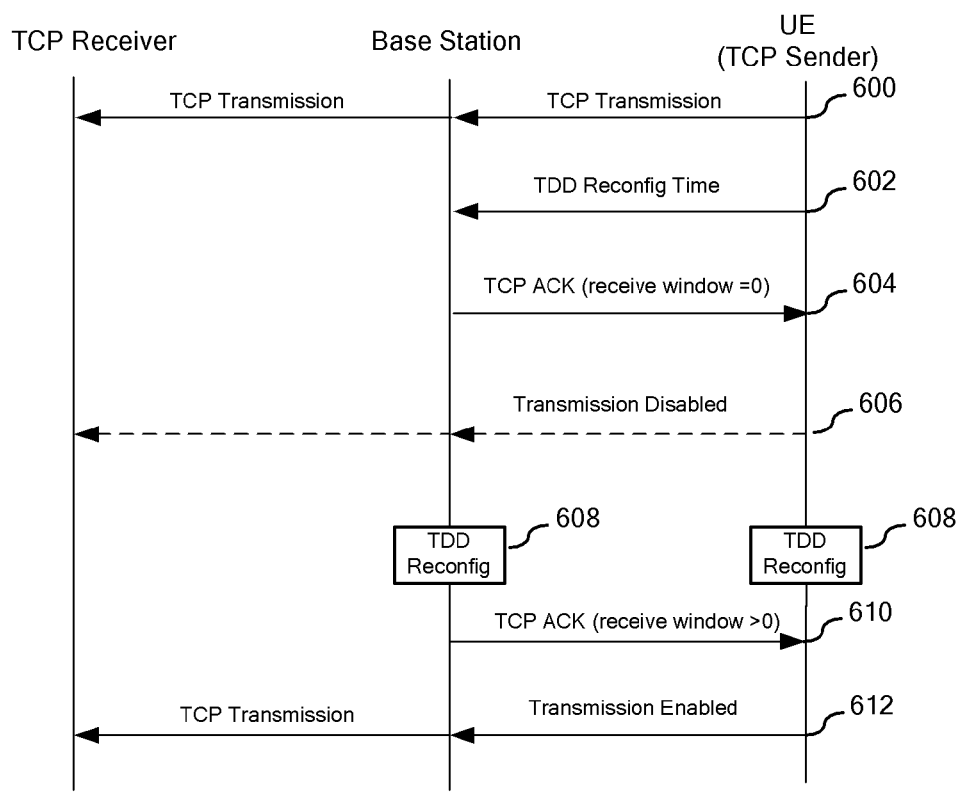
FIG. 6 is a sequence chart of a fourth example according to the present invention.

FIG. 6 is a sequence chart of a fourth example according to the present invention. In this example, a base station forwards to a TCP receiver a TCP transmission sent from a TCP sender (in this case, a UE served by the base station). As shown in FIG. 6, at step 600, the TCP transmission is in progress. The base station decides to perform a TDD reconfiguration.

At step 602, the determining unit 110 of the base station determines TDD reconfiguration time required for a TDD reconfiguration, as described above. Then the comparing unit 120 of the base station compares the TDD reconfiguration time determined by the determining unit 110 with a predetermined threshold. Alternatively, the determination and the comparison can be carried out at the UE's initial access to the base station.

If the comparison by the comparing unit 120 indicates that the TDD reconfiguration time is larger than the predetermined threshold, then, at step 604, the acknowledge transmitting unit of the base station transmits to the UE a first TCP ACK packet to disable the UE from sending any further TCP packet. Here, the first TCP ACK packet can have a receive window field of zero value. As an example, the acknowledge transmitting unit can intercept a TCP ACK packet to be forwarded to the UE, overwrite the receive window field of the intercepted TCP ACK packet into 0 and transmit the TCP ACK packet to the UE.

Then, at step 606, the UE is disabled from sending any further TCP packet. At step 608, the TDD reconfiguration is performed at both the base station and the UE. After the TDD reconfiguration is completed, i.e., after the TDD reconfiguration time has lapsed, at step 610, the acknowledge transmitting unit of the base station transmits to the UE a second TCP ACK packet to enable the UE to send any further TCP packet. Here, the second TCP ACK packet can have a receive window field of a non-zero value. In the above example where the acknowledge transmitting unit intercepts a TCP ACK packet and overwrites the receive window field of the intercepted TCP ACK packet into 0, at step 610, the acknowledge transmitting unit can transmit to the UE the intercepted TCP ACK packet as it is.

At step 612, the UE is enabled to transmit further TCP packets.

On the other hand, if at step 602 the comparison by the comparing unit 120 indicates that the TDD reconfiguration time is smaller than the predetermined threshold, the step 604, 606, 610 and 612 can be omitted and no special action is carried out for the TDD reconfiguration.

Fifth Example

Figure 7:
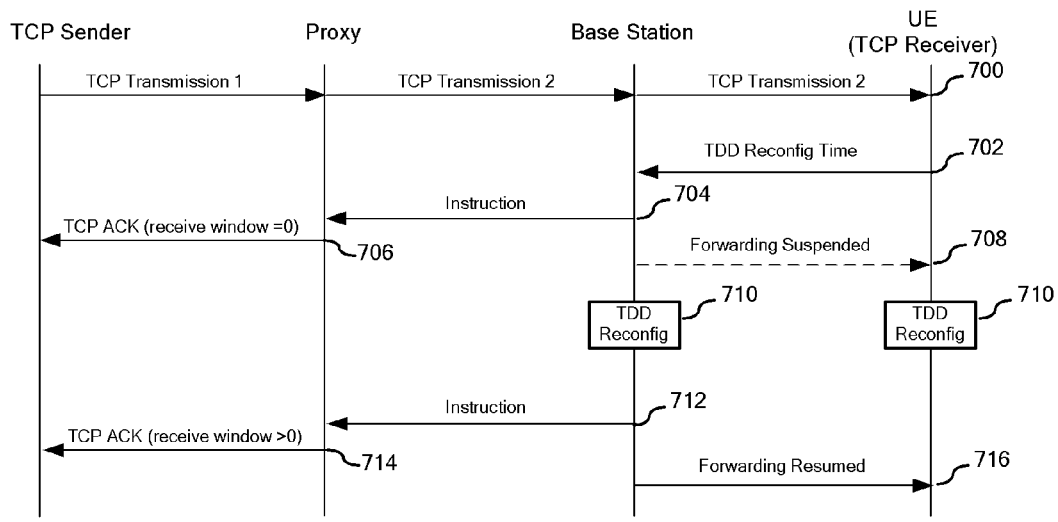
FIG. 7 is a sequence chart of a fifth example according to the present invention.

FIG. 7 is a sequence chart of a fifth example according to the present invention. In this example, a base station forwards to a TCP receiver (in this case, a UE served by the base station) a TCP transmission sent from a TCP sender. As shown in FIG. 7, the TCP transmission includes a first TCP transmission (TCP Transmission 1) from the TCP sender to a proxy and a second TCP transmission (TCP Transmission 2) from the proxy to the TCP receiver. The proxy is located between the TCP sender and the base station. At step 700, the TCP transmission is in progress. The base station decides to perform a TDD reconfiguration.

At step 702, the determining unit 110 of the base station determines TDD reconfiguration time required for a TDD reconfiguration, as described above. Then the comparing unit 120 of the base station compares the TDD reconfiguration time determined by the determining unit 110 with a predetermined threshold. Alternatively, the determination and the comparison can be carried out at the UE's initial access to the base station.

If the comparison by the comparing unit 120 indicates that the TDD reconfiguration time is larger than the predetermined threshold, then, at step 704, the instructing unit of the base station instructs the proxy to transmit to the TCP sender a first ACK packet at step 706 to disable the TCP sender from sending any further TCP packet. Here, the first TCP ACK packet can have a receive window field of zero value.

Then, at step 708, the suspending unit 130 of the base station suspends the forwarding of the TCP transmission to the TCP receiver. At step 710, the TDD reconfiguration is performed at both the base station and the UE. During the suspension, i.e., during the TDD reconfiguration time, the TCP packets received from the TCP sender (i.e., TCP packets transmitted from the TCP sender before it receives the first TCP ACK packet and arriving at the base station during the TDD reconfiguration time) will be buffered at the base station without forwarding to the UE. After the TDD reconfiguration is completed, i.e., after the TDD reconfiguration time has lapsed, at step 712, the instructing unit of the base station instructs the proxy to transmit to the TCP sender a second TCP ACK packet at step 714 to enable the TCP sender to send any further TCP packet. Here, the second TCP ACK packet can have a receive window field of a non-zero value.

At step 714, the resuming unit 140 of the base station resumes the forwarding of the TCP transmission and the buffered TCP packets, if any, can now be forwarded to the UE.

On the other hand, if at step 702 the comparison by the comparing unit 120 indicates that the TDD reconfiguration time is smaller than the predetermined threshold, the step 704, 706, 708, 712, 714 and 716 can be omitted and no special action is carried out for the TDD reconfiguration.

Sixth Example

Figure 8:
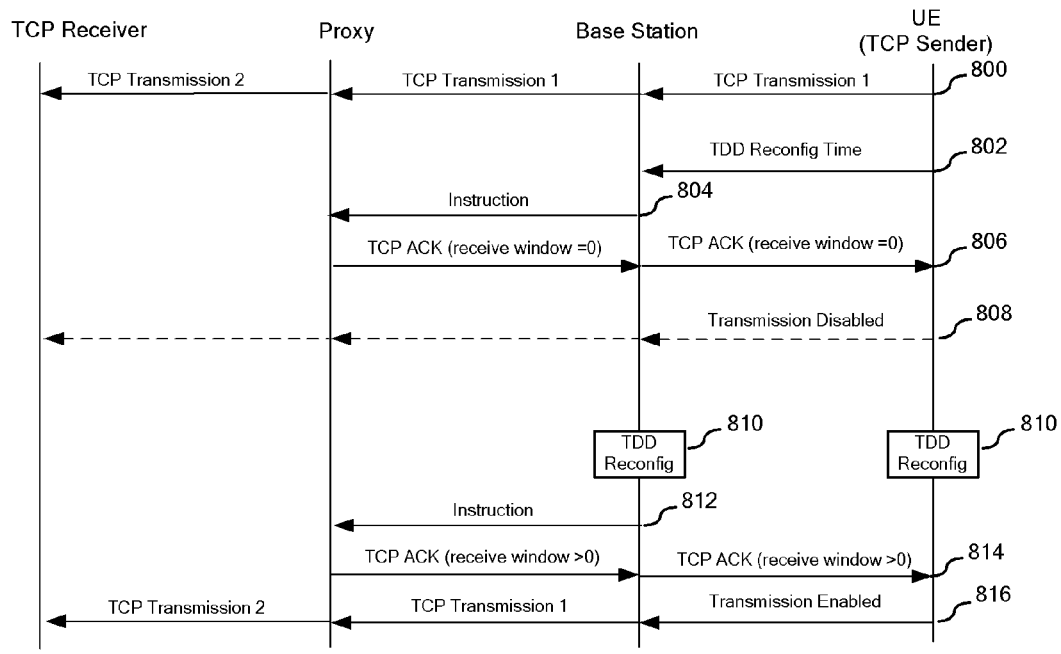
FIG. 8 is a sequence chart of a sixth example according to the present invention.

FIG. 8 is a sequence chart of a sixth example according to the present invention. In this example, a base station forwards to a TCP receiver a TCP transmission sent from a TCP sender (in this case, a UE served by the base station). As shown in FIG. 8, the TCP transmission includes a first TCP transmission (TCP Transmission 1) from the TCP sender (i.e., UE) to a proxy and a second TCP transmission (TCP Transmission 2) from the proxy to the TCP receiver. The proxy is located between the TCP receiver and the base station. At step 800, the TCP transmission is in progress. The base station decides to perform a TDD reconfiguration.

At step 802, the determining unit 110 of the base station determines TDD reconfiguration time required for a TDD reconfiguration, as described above. Then the comparing unit 120 of the base station compares the TDD reconfiguration time determined by the determining unit 110 with a predetermined threshold. Alternatively, the determination and the comparison can be carried out at the UE's initial access to the base station.

If the comparison by the comparing unit 120 indicates that the TDD reconfiguration time is larger than the predetermined threshold, then, at step 804, the instructing unit of the base station instructs the proxy to transmit to the TCP sender a first ACK packet at step 806 to disable the UE from sending any further TCP packet. Here, the first TCP ACK packet can have a receive window field of zero value.

Then, at step 808, the UE is disabled from sending any further TCP packet. At step 810, the TDD reconfiguration is performed at both the base station and the UE. After the TDD reconfiguration is completed, i.e., after the TDD reconfiguration time has lapsed, at step 812, the instructing unit of the base station instructs the proxy to transmit to the UE a second TCP ACK packet at step 714 to enable the UE to send any further TCP packet. Here, the second TCP ACK packet can have a receive window field of a non-zero value.

At step 816, the UE is enabled to transmit further TCP packets.

On the other hand, if at step 802 the comparison by the comparing unit 120 indicates that the TDD reconfiguration time is smaller than the predetermined threshold, the step 804, 806, 808, 812, 814 and 816 can be omitted and no special action is carried out for the TDD reconfiguration.

Figure 9:
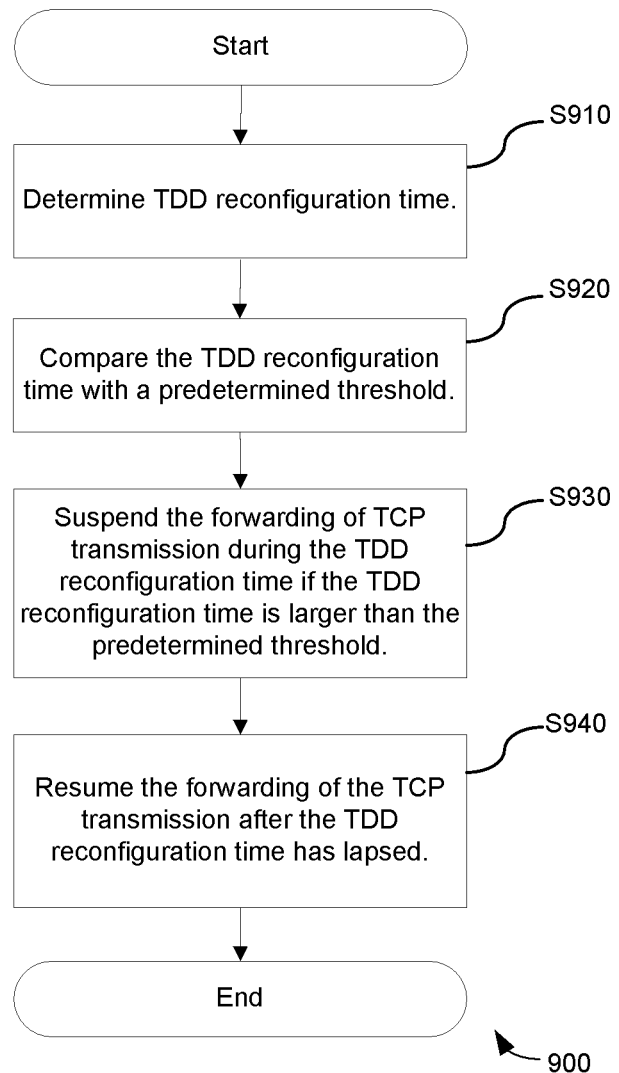
FIG. 9 is a flowchart of a method for forwarding TCP transmission according to an embodiment of the present invention.

Reference is now made to FIG. 9, which is a flowchart of a method 900 for forwarding to a TCP receiver a TCP transmission sent from a TCP sender according to an embodiment of the present invention. The method can be performed at a base station.

At step S910, Time Division Duplex (TDD) reconfiguration time required for a TDD reconfiguration is determined.

At step S920, the TDD reconfiguration time is compared with a predetermined threshold.

At step S930, the forwarding of the TCP transmission to the TCP receiver is suspended during the TDD reconfiguration time if the TDD reconfiguration time is larger than the predetermined threshold.

At step S940, the suspended forwarding of the TCP transmission is resumed after the TDD reconfiguration time has lapsed.

Preferably, the method 900 further includes: prior to the TDD reconfiguration, delaying the forwarding of the TCP transmission for a time period dependent on the TDD reconfiguration time, such that an expiration value of the TCP timeout timer at the TCP sender is increased to a value that does not cause the timer to expire due to the suspension.

Preferably, the method 900 further includes: prior to the TDD reconfiguration, transmitting to the TCP sender a first TCP Acknowledge (ACK) packet to disable the TCP sender from sending any further TCP packet; and after the TDD reconfiguration time has lapsed, transmitting to the TCP sender a second TCP ACK packet to enable the TCP sender to send any further TCP packet.

Preferably, the first TCP ACK packet has a receive window field of zero value.

Preferably, the second TCP ACK packet has a receive window field of a non-zero value.

In an embodiment, the TCP receiver is a user equipment served by the base station.

Preferably, the TCP transmission comprises a first TCP transmission from the TCP sender to a proxy and a second TCP transmission from the proxy to the TCP receiver. The method further includes: prior to the TDD reconfiguration, instructing the proxy to transmit to the TCP sender a first TCP Acknowledge (ACK) packet to disable the TCP sender from sending any further TCP packet; and after the TDD reconfiguration time has lapsed, instructing the proxy to transmit to the TCP sender a second TCP ACK packet to enable the TCP sender to send any further TCP packet.

In an embodiment, the proxy is located between the TCP sender and the base station.

Figure 10:
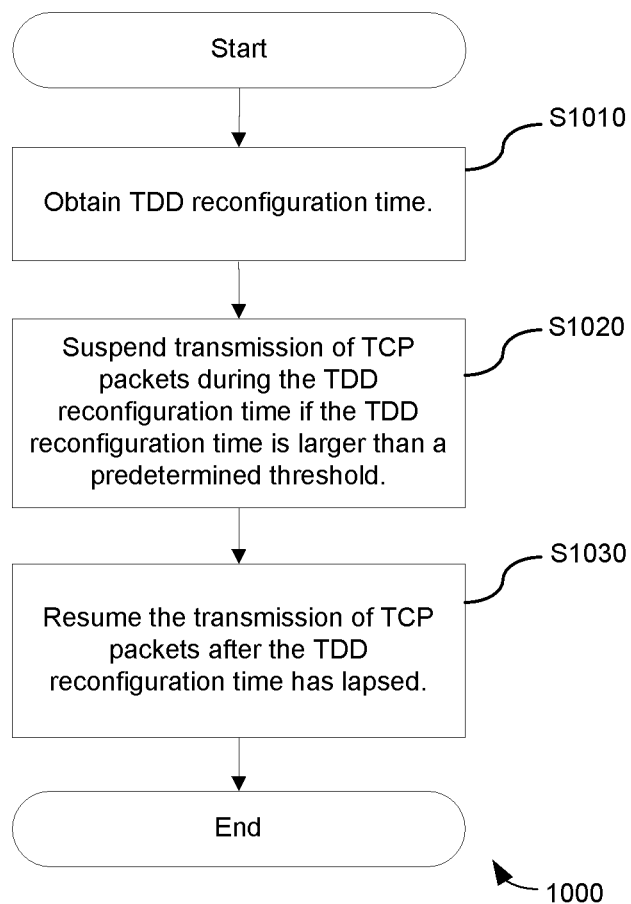
FIG. 10 is a flowchart of a method for transmitting TCP transmission according to an embodiment of the present invention.

Reference is now made to FIG. 10, which is a flowchart of a method 1000 for transmitting a TCP transmission to a TCP receiver according to an embodiment of the present invention. The method can be performed at a UE and the TCP transmission can be transmitted from the UE to the TCP receiver via a base station.

At step S1010, Time Division Duplex (TDD) reconfiguration time required for a TDD reconfiguration is obtained.

At step S1020, transmission of TCP packets to the TCP receiver is suspended during the TDD reconfiguration time if the TDD reconfiguration time is larger than a predetermined threshold.

At step S1030, the suspended transmission of TCP packets is resumed after the TDD reconfiguration time has lapsed.

Preferably, the method further includes: comparing the TDD reconfiguration time with the predetermined threshold to determine if the TDD reconfiguration time is larger than the predetermined threshold.

Preferably, the method further includes: prior to the TDD reconfiguration, delaying, at a lower layer than the TCP layer, transmission of TCP packets for a time period dependent on the TDD reconfiguration time, such that an expiration value of the TCP timeout timer at the UE is increased to a value that does not cause the timer to expire due to the suspension.

With the present invention, the unnecessary transmission of TCP packets during the TDD reconfiguration time can be avoided. Further, in the above embodiments, appropriate mechanisms are provided to ensure that the timeout timer at the TCP sender will not expire due to the TDD reconfiguration, such that the TCP transmission can be promptly recovered after the TDD reconfiguration.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

The invention claimed is:

1. A method for forwarding to a Transport Control Protocol (TCP) receiver a TCP transmission sent from a TCP sender, the method comprising:
   determining, by a base station, Time Division Duplex (TDD) reconfiguration time required for a TDD reconfiguration that includes allocating a number of subframes, wherein the determination is based on a higher value between a first TDD reconfiguration time required by the base station and a second TDD reconfiguration time required by a user equipment (UE);
   comparing, by the base station, the TDD reconfiguration time with a predetermined threshold;
   suspending, by the base station, the forwarding of the TCP transmission to the TCP receiver during the TDD reconfiguration time if the TDD reconfiguration time is larger than the predetermined threshold; and
   resuming, by the base station, the suspended forwarding of the TCP transmission after the TDD reconfiguration time has lapsed.

2. The method of claim 1, further comprising: prior to the TDD reconfiguration,
   delaying the forwarding of the TCP transmission for a time period dependent on the TDD reconfiguration time, such that an expiration value of a TCP timeout timer at the TCP sender is increased to a value that does not cause the TCP timeout timer to expire due to the suspension.

3. The method of claim 1, further comprising:
   prior to the TDD reconfiguration, transmitting to the TCP sender a first TCP Acknowledge (ACK) packet to disable the TCP sender from sending any further TCP packet, wherein the first TCP ACK packet is intercepted and a receive window field is overwritten to be zero; and
   after the TDD reconfiguration time has lapsed, transmitting to the TCP sender a second TCP ACK packet to enable the TCP sender to send any further TCP packet.

4. The method of claim 3, wherein the first TCP ACK packet has a receive window field of a zero value, and the second TCP ACK packet has a receive window field of a non-zero value.

5. The method of claim 1, wherein the TCP receiver is the user equipment served by the base station.

6. The method of claim 1, wherein the TCP transmission comprises a first TCP transmission from the TCP sender to a proxy and a second TCP transmission from the proxy to the TCP receiver, and wherein the method further comprises:
   prior to the TDD reconfiguration, instructing the proxy to transmit to the TCP sender a first TCP Acknowledge (ACK) packet to disable the TCP sender from sending any further TCP packet; and
   after the TDD reconfiguration time has lapsed, instructing the proxy to transmit to the TCP sender a second TCP ACK packet to enable the TCP sender to send any further TCP packet.

7. The method of claim 6, wherein the method is applicable on the base station, the TCP receiver is the user equipment served by the base station, and the proxy is located between the TCP sender and the base station.

8. A method for transmitting a Transport Control Protocol (TCP) transmission to a TCP receiver, the method comprising:
   obtaining, by a user equipment, Time Division Duplex (TDD) reconfiguration time required for a TDD reconfiguration that includes allocating a number of subframes, wherein the obtainment is based on a higher value between a first TDD reconfiguration time required by a base station and a second TDD reconfiguration time required by the user equipment (UE);
   suspending, by the user equipment, transmission of TCP packets to the TCP receiver during the TDD reconfiguration time if the TDD reconfiguration time is larger than a predetermined threshold; and
   resuming, by the user equipment the suspended transmission of TCP packets after the TDD reconfiguration time has lapsed.

9. The method of claim 8, further comprising:
   comparing the TDD reconfiguration time with the predetermined threshold to determine if the TDD reconfiguration time is larger than the predetermined threshold.

10. The method of claim 8, further comprising: prior to the TDD reconfiguration, delaying, at a lower layer than a TCP layer, transmission of TCP packets for a time period dependent on the TDD reconfiguration time, such that an expiration value of a TCP timeout timer at a user equipment (UE) is increased to a value that does not cause the TCP timeout timer to expire due to the suspension.

* * * * *